(12) United States Patent
Lin et al.

(10) Patent No.: US 6,577,809 B2
(45) Date of Patent: Jun. 10, 2003

(54) USER SELECTABLE VARIABLE TRICK MODE SPEED

(75) Inventors: Shu Lin, Indianapolis, IN (US); Donald Henry Willis, Indianapolis, IN (US)

(73) Assignee: Thomson Licensing S.A., Boulogne-Cedex (FR)

(*) Notice: Subject to any disclaimer, the term of this patent is extended or adjusted under 35 U.S.C. 154(b) by 0 days.

(21) Appl. No.: 10/211,803

(22) Filed: Aug. 1, 2002

(65) Prior Publication Data

US 2003/0077073 A1 Apr. 24, 2003

Related U.S. Application Data

(60) Provisional application No. 60/334,914, filed on Oct. 23, 2001.

(51) Int. Cl.$^7$ .................................................. H04N 5/91
(52) U.S. Cl. ........................................... 386/68; 386/82
(58) Field of Search ................................ 386/68, 67, 69, 386/70, 82, 109, 111, 112, 27, 33, 125, 126, 124, 6, 7, 46, 1, 45; H04N 5/91

(56) References Cited

U.S. PATENT DOCUMENTS

| | | | | |
|---|---|---|---|---|
| 5,282,049 A | * | 1/1994 | Hatakenaka et al. | |
| 5,377,051 A | * | 12/1994 | Lane et al. | |
| 6,424,792 B1 | * | 7/2002 | Tsukagoshi et al. | |

* cited by examiner

*Primary Examiner*—Robert Chevalier
(74) *Attorney, Agent, or Firm*—J. S. Tripoli; H. D. Fried; R. B. Levy

(57) ABSTRACT

Upon user selection of a particular trick mode, the number of pictures that are displayed can be accordingly adjusted to correspond with the selected trick mode speed based on a determined display time. Subsequently, the bandwidth usage can be can be determined to ensure that the channel capacity between a playback device (100) and a remote decoder (136) has not been exceeded. For forward trick modes, in a case where the bandwidth between the playback device (100) and the remote decoder (136) would be exceeded, B-pictures can be uniformly eliminated throughout the playback segment. Where B-pictures were present and they have been eliminated, they can be replaced by dummy B-pictures. Again, if there is still insufficient bandwidth available between the playback device (100) and remote decoder (136), then P-pictures can be eliminated from the playback segment and uniformly replaced by dummy P-pictures.

48 Claims, 4 Drawing Sheets

USER SELECTABLE VARIABLE TRICK MODE SPEED

CROSS REFERENCE TO RELATED APPLICATIONS

This application claims priority under 35 U.S.C. 119(e) to Provisional Application Ser. No. 60/334,914 filed on Oct. 23, 2001.

BACKGROUND OF THE INVENTION

1. Field of the Invention

The invention concerns improved trick mode playback, and more particularly to providing user flexibility in selecting a variable speed trick mode.

2. Description of the Related Art

The introduction of disks recorded with digitally compressed audio and video signals, for example, utilizing MPEG compression protocols, can provide sound and picture quality that is virtually indistinguishable from the original material. However, users will expect such digital video disks (DVDs) to offer, at a minimum, features similar to those of predecessor devices such as an analog videocassette recorder (VCR). For example, a DVD can be expected to provide playback in either forward or reverse directions at speeds slower or faster than a normal playback speed, designated 1× by convention. Such non-standard speed playback features are known as trick modes.

Providing trick mode features for MPEG encoded video signals can be challenging due to the hierarchical nature of the compression algorithms that are used to form pictures having varying degrees of compression into groups. These groups are termed groups of pictures (GOPs) and can require sequential decoding. Within this disclosure, a GOP can be extended to include a structure between two successive intra-coded pictures plus one of the intra-coded pictures. A detailed description of the MPEG 2 standard is published as ISO/IEC Standard 13818-2.

Notwithstanding, an MPEG 2 signal stream can comprise three types of pictures having varying degrees of content compression. An intra-coded picture (I-picture) has the least compression of the three types and can be decoded without reference to any other picture. A predictive picture (P-picture) can be compressed with reference to a preceding I-picture or P-picture and the P-picture can achieve a greater degree of compression than an I-picture. The third type of MPEG picture, termed a bi-directionally predictive picture (B-picture), can be compressed based on predictions from preceding and/or succeeding I or P pictures. B-pictures can have the greatest degree of compression. The three types of MPEG pictures can be arranged to form GOPs.

FIG. 1 depicts an exemplary GOP 55 within an MPEG display sequence 50. Referring to FIG. 1, GOP 55 can contain 12 consecutive pictures within the MPEG display sequence 50. Since only an I-picture is decodable without reference to any other picture, each GOP can only be decoded following the decoding of an I-picture. The first P-picture can be decoded and stored based on the stored preceding I-picture. The prediction of a P-picture based on the preceding I-picture is indicated by 62. Subsequent P-pictures can be predicted from the preceding P-picture. The prediction of a P-picture based on the preceding P-picture is indicated by 60 and 68. Finally, B-pictures can be decoded by means of predictions from preceding and/or succeeding reference pictures, for example, stored P-pictures. Exemplary predictions of a B-picture from a preceding P-picture are 64 and 70. Exemplary predictions of a B-picture from a succeeding P-picture are 66 and 72.

The hierarchical nature of the coded pictures comprising MPEG groups of pictures necessitate that the I-pictures and P-pictures of each GOP are decoded in the forward direction. In the forward direction, playback typically occurs sequentially although pictures can be skipped or added to achieve a desired playback speed. Importantly, in the reverse mode, features can be provided by effectively jumping back to an earlier or preceding I-picture and then decoding in a forward direction through the GOP corresponding to that I-picture. The decoded pictures can be stored in frame buffer memories for subsequent read out in a reverse direction to achieve a desired reverse program sequence.

To provide visually smooth reproduction during trick modes, timely disk retrieval and access to specific pictures from memory can be required. Although each digital disk can be encoded with navigation data that provides picture access points, these are limited in number, and may inherently contribute to temporally aliased image motion. In order to achieve temporally smooth trick mode reproduction at varying speeds in forward and reverse directions, it can be necessary to provide access to, and decoding of all encoded pictures. This can require vast amounts of high-speed memory and where such memory is unavailable, the buffers can be overrun resulting in loss of pictures and degradation in performance. Thus, a need exists for improved trick mode performance without relying entirely on vast amounts of high-speed memory and processing power.

Although a playback device can have a locally associated decoder, a remotely located decoder arrangement is also possible. For example, a playback device can include an integrated decoder. However, a display device placed at a location remote from the playback device can also have its own decoder. In this regard, the decoder associated with the display device can be called a remote decoder. In remote decoder arrangements, it can be very difficult to perform trick modes. Oftentimes, a trick mode involves skipping a number of pictures in a video signal such as during a fast motion trick mode. Skipping pictures in a video signal being transmitted to a remote decoder can actually increase the average bit rate of the signal. Since the bandwidth between the digital video recorder or player and the remotely located decoder is generally limited, performing a fast motion trick mode may cause the signal to exceed the maximum bit rate of the transmission channel.

SUMMARY

The invention provides a method and system for implementing a selectable variable trick mode playback speed for playback of a compressed video presentation stored on a storage medium. A user can select the selectable variable trick mode. The method can include, in response to a command for trick mode playback of a portion of the video presentation, determining a display time for displaying a segment of the portion of the video presentation at the selected variable trick mode speed. Subsequently, a selection of the pictures to be deleted from the segment can be made in order to achieve the determined trick mode display time during the playback of the portion of the video presentation at the selected variable trick mode speed. The selected pictures can subsequently be deleted. The trick mode display time can represent the time required for displaying the pictures in the segment of the video presentation at the selected variable trick mode playback speed.

In accordance with the inventive arrangements, the step of determining the display time for the segment at the selected variable trick mode speed can further include the step of determining a display time required for displaying the segment at a normal playback speed of 1×. Subsequent to determining the display time required for displaying the pictures in the segment at the selected variable trick mode speed, the display time for the segment can be adjusted to ensure that it is an integer number of field display periods. A residual portion remaining from adjusting the display time for the segment can be added to a trick mode display time for a segment of the video presentation that will subsequently be displayed during playback at the selected variable trick mode speed. The subsequent segment can be a remaining portion of the pictures in an existing segment or another segment of the video presentation. The command for trick mode playback of the portion of the video presentation can be a forward trick mode command.

The method can further include the step of displaying a remaining portion of the pictures resulting from deletion of the determined pictures from the segment, the remaining pictures being displayed at the selected variable trick mode speed. The segment of the video presentation can be a group of pictures or any other suitable grouping or categorization of the pictures. In determining or selecting which pictures can be deleted the lowest priority pictures can be selected first. Additional lowest priority pictures can be replaced with dummy pictures if the available bandwidth would be exceeded when the lowest priority pictures can be deleted from the segment. Advantageously, the dummy pictures can preferably be distributed evenly throughout the segment. The method can further include the step of decoding at least a portion of the segment of the portion of the video presentation with a remote decoder, and the command for trick mode playback can be a fast trick mode playback command.

In a further aspect of the invention, a system for implementing a selectable variable trick mode playback speed for playback of a compressed video presentation stored on a storage medium is provided. A user can select the selectable variable trick mode speed. The system can include means for determining a display time for displaying a segment of a portion of the video presentation at the selected variable trick mode speed. The determining means can be configured to respond to a command for trick mode playback of the portion of the video presentation. Additionally, the system can also provide means for selecting which pictures are to be deleted from the segment to achieve the determined trick mode display time during the playback of the segment of the video presentation at the selected variable trick mode speed. The system can also provide means for deleting those pictures selected for deletion. The means for determining the display time for the segment at the selected variable trick mode speed can further comprise means for determining a display time required for displaying the segment at a normal playback speed.

In accordance with the inventive arrangements, the means for determining the display time for the segment at the selected variable trick mode speed can further include means for adjusting the display time for the segment to an integer number of field display periods. The system can further include means for adding a residual portion of the display time remaining from the adjusted display time for the segment to a trick mode display time for a subsequently displayed segment of the portion of the video presentation played back at the selected variable trick mode speed. The trick mode playback can be a forward playback trick mode, although the invention is not limited in this regard. The system can further include means for displaying a remaining portion of the pictures resulting from the deletion of the pictures from the segment. Notably, the segment can be a group of pictures. In this regard, the display means can display the remaining pictures at the selected variable fast trick mode speed.

The means for selecting those pictures that are to be deleted from the segment can further include means for determining which pictures are to be deleted based on a priority of the pictures. The selecting means can further include means for selecting those pictures having lowest priority within segment or group of pictures. The system can further include means for replacing additional lowest priority pictures with dummy pictures if the available bandwidth of the channel would be exceeded when the lowest priority pictures are deleted from the segment. Preferably, the dummy pictures can be evenly distributed throughout the segment. The system can further include a remote decoder for decoding at least a portion of the segment of the portion of the video presentation with a remote decoder, and the command for trick mode playback can be a fast trick mode playback command.

In a further aspect of the invention, a method for implementing a selectable variable trick mode playback speed for playback of a compressed video presentation stored on a storage medium is provided. The method can include, responsive to a command for trick mode playback of a portion of the video presentation, determining a display time for displaying a segment of the portion of the video presentation at the selected variable trick mode speed. Pictures can be selected to be repeated from the segment to achieve the determined display time during the playback of the portion of the video presentation at the selected variable trick mode speed. Notably, the selected pictures can be repeated. The command can be a forward trick mode command.

The step of determining the display time for the segment at the selected variable trick mode speed can further include the step of determining a display time required for displaying the segment at a normal playback speed. To determine the display time for the segment at the selected variable trick mode speed, the display time for the segment can be adjusted to an integer number of field display periods.

Moreover, a residual portion remaining from the adjusted display time for the segment can be added to a trick mode display time for a subsequently displayed segment of the portion of the video presentation played back at the selected variable trick mode speed. The method can further include the step of displaying a remaining portion of the pictures resulting from repetition of the determined pictures from the segment. Importantly, these remaining pictures can be displayed at the selected variable trick mode speed.

The segment of the video presentation can be a group of pictures. A picture priority can be used to determine those pictures in a segment that are to be repeated. In this regard, the step of selecting which pictures are to be repeated from the segment can further include the step of selecting pictures having highest priority within a segment. The method can further include the step of decoding at least a portion of the segment of the portion of the video presentation with a remote decoder, and the command for trick mode playback can be a slow trick mode playback command.

The invention further provides a system for implementing a selectable variable trick mode playback speed for playback of a compressed video presentation stored on a storage medium. The system can include means for determining a display time for displaying a segment of a portion of the video presentation at the selected variable trick mode speed. The means for determining the display time can be responsive to a command for trick mode playback of the portion of the video presentation. The command can be a forward trick mode command. Selecting means can be provided for selecting which pictures are to be repeated from the segment to achieve the determined trick mode display time during the playback of the portion of the video presentation at the selected variable trick mode speed. Repeating means can be provided for repeating the selected pictures.

The means for determining the display time for the segment at the selected variable trick mode speed can further include means for determining a display time required for displaying the segment at a normal playback speed. The means for determining the display time for the segment at the selected variable trick mode speed can further include means for adjusting the display time for the segment to an integer number of field display periods. The system can further include means for adding a residual portion remaining from the adjusted display time for the segment to a trick mode display time for a subsequently displayed segment of the portion of the video presentation played back at the selected variable trick mode speed.

Display means can be provided for displaying a remaining portion of the pictures resulting from repetition of selected pictures from the segment. The segment of the video presentation can be a group of pictures. The display means can display the remaining pictures at the selected variable trick mode speed. The selecting means can further include means for determining which pictures are to be repeated based on a priority of the pictures. In this regard, the selecting means can further include means for selecting pictures having highest priority within the segment. The system can further include a remote decoder for decoding at least a portion of the segment of the portion of the video presentation, and the command for trick mode playback can be a slow trick mode playback command.

DETAILED DESCRIPTION

Figure 2:
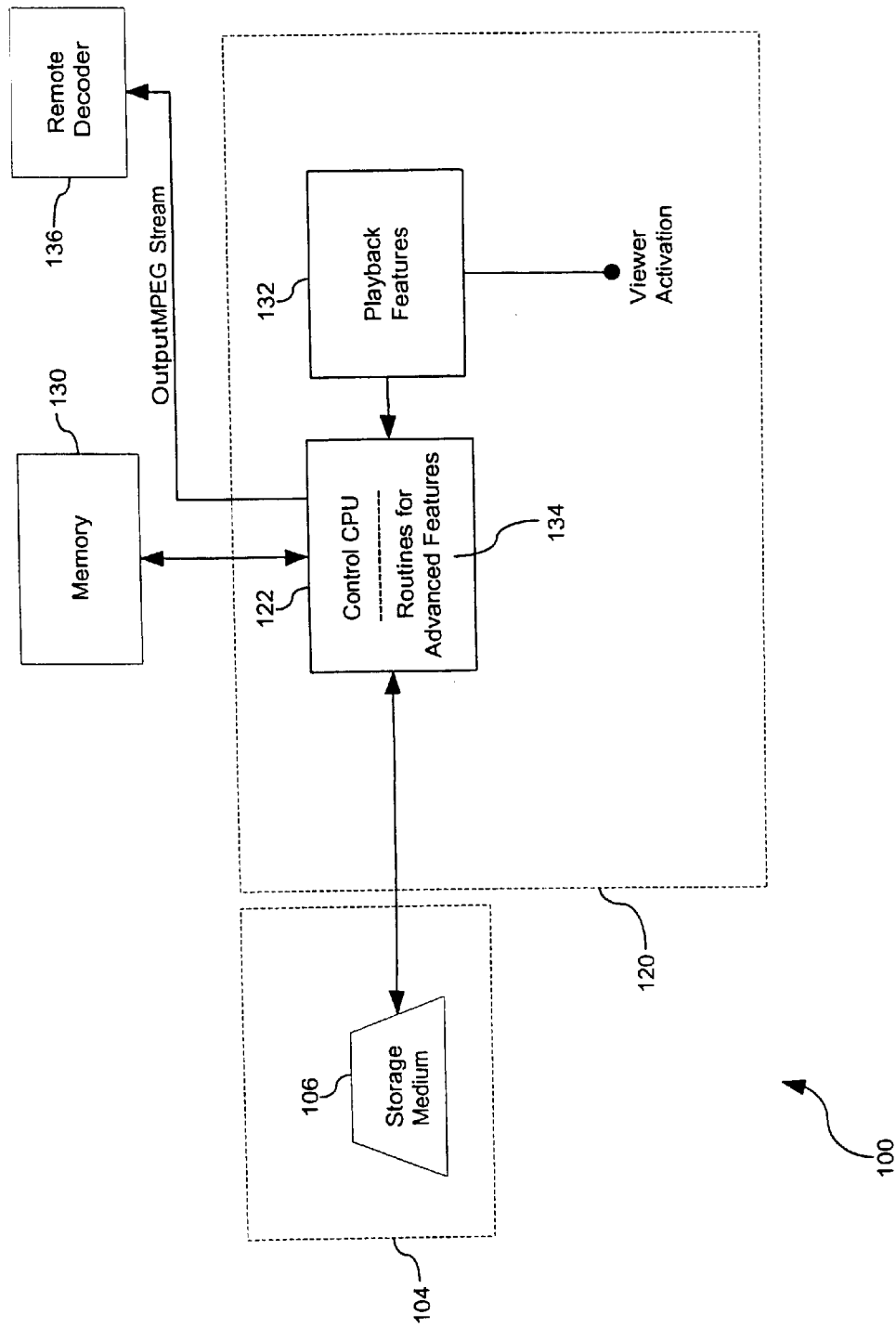
FIG. 2 illustrates an exemplary apparatus for decoding and displaying pictures during a trick mode playback.

A device 100 for implementing the various advanced operating features in accordance with the invention taught herein, can utilize a file storage system 104 in accordance with the inventive arrangements depicted in the block diagram of FIG. 2. Although FIG. 2 illustrates a disk-based storage medium 106, it is understood that the invention can be practiced with any MPEG or other compressed video playback device regardless of the status of the storage medium 106. As used herein, MPEG or MPEG video refers to video compression according to the MPEG encoding standard, including but not limited to MPEG-1, MPEG-2. Furthermore, the term segment will be used herein to broadly include GOPs and any segmentation mechanism where the video data segment can be divided into manageable chunks of video data, each chunk being a segment. A segment can be of the order of about ½–1 second of video, although the invention is not limited in this regard. The storage medium 106 is embodied as a fixed disk in the illustrated embodiment. In many instances, as will be appreciated the file storage system 104 can also be, for example, a solid-state memory, optical disk, magnetic disk, or a magneto optical disc (MOD). An example of a MOD is a mini-disc. In any case, such storage systems are well known in the art and their operation is not critical to the understanding of the instant invention.

Control section 120 of device 100 can include a control central processing unit (CPU) 122. The control CPU 122 can include routines 134 for enabling and controlling playback features in accordance with the present invention. Playback features buffer 132 for viewer activatable functions can facilitate the operation of exemplary functions, namely play, stop, reverse, fast forward, and pause. These functions, other than play and stop, are trick mode functions. The pause can be analogous to the pause operation in a VCR, which can facilitate manual interruption of the play back of a prerecorded presentation. The pause operation in a VCR could also be used for interrupting the recording of a viewed program in order to eliminate commercials from the recording.

Figure 1:
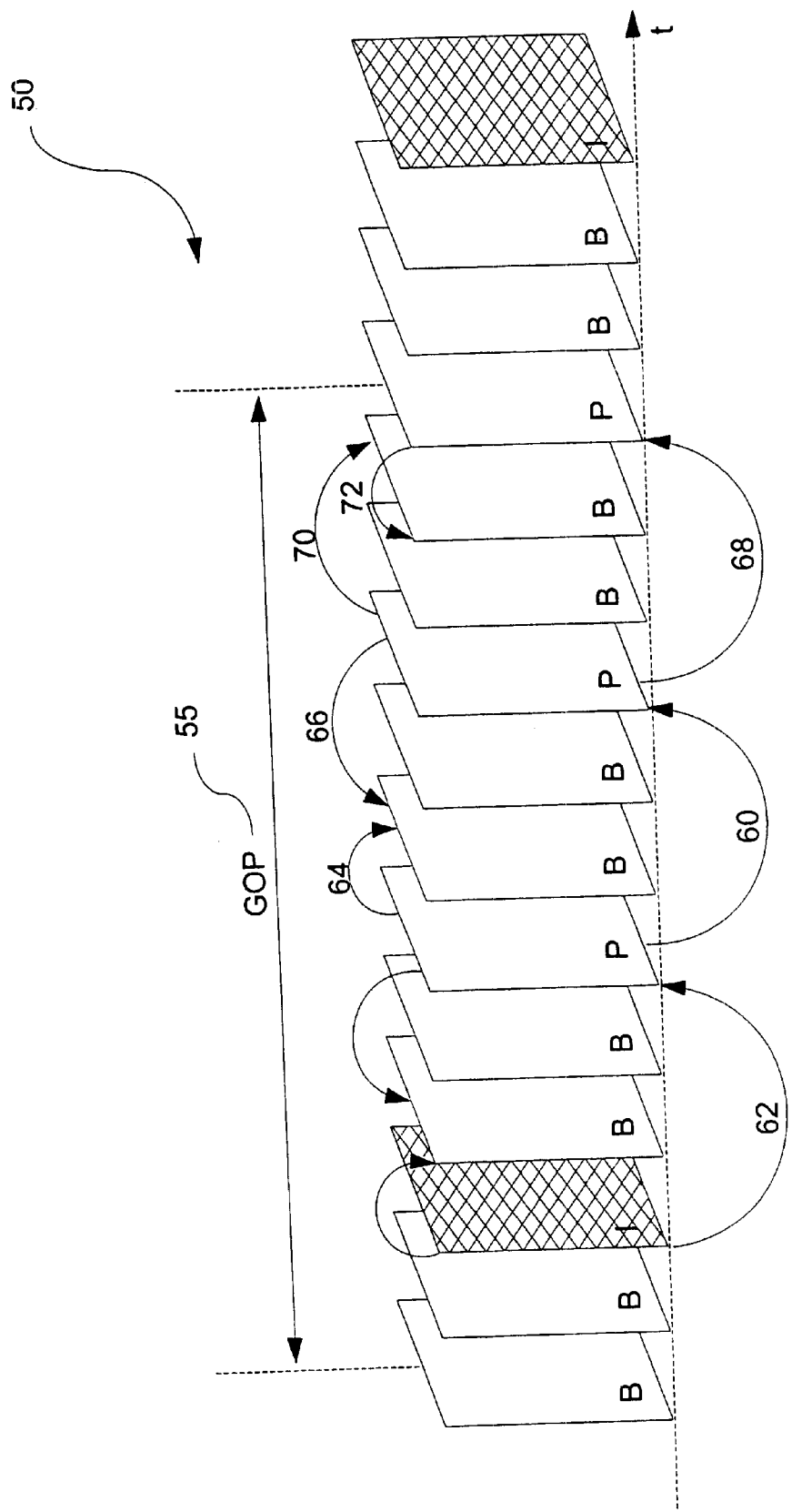
FIG. 1 depicts an exemplary GOP structure within an MPEG display sequence.

Control CPU 122 can be configured to read information from storage medium 106, and/or generate and store the resulting data. Memory 130 can be used to store information or data generated by control CPU 122. The output signal generated by the control CPU 122 can be an MPEG formatted data stream. This output data can be fed to a remotely located MPEG decoder 136 or a local decoder (not shown), although the invention is not limited in this regard. A remotely located decoder can be any decoder that is not under the control of the control CPU 122, an arrangement that is illustrated in FIG. 1. Conversely, a local decoder can be any decoder that is under the control of the control CPU 122. The use of an information file in accordance with the inventive arrangements can advantageously overcome an important limitation in decoding digitally encoded signals with a remotely located decoder. Specifically, it is very difficult to perform trick modes in remotely located decoder arrangements.

Oftentimes, the performance of a trick mode can involve skipping a number of pictures in a video signal such as during a fast motion trick mode. Skipping pictures in a video signal being transmitted to a remote decoder, such as decoder 136, can actually increase the average bit rate of the signal. Since the bandwidth between the digital video recorder or player and the remotely located decoder is generally limited, performing a fast motion trick mode may cause the signal to exceed the maximum bit rate of the transmission channel. Parameters pertaining to the location of pictures in a GOP can be stored in a file called an information file. An information file can be stored on the storage media where a video presentation is stored. Advantageously, data contained in the information file can be used to predict the occurrence of certain events and to solve problems such as excessive bit rate, by dispersing dummy pictures throughout the MPEG video stream to provide a smoother trick mode.

Advantageously, the invention provides a series of steps for varying the trick mode playback to facilitate a variably selected trick mode speed. Initially, upon user selection of a particular trick mode speed, the number of pictures that are displayed can be accordingly adjusted to correspond with the selected trick mode speed. Subsequently, the bandwidth usage can be determined to ensure that the channel capacity between a playback device and a remote decoder has not been exceeded.

For forward trick modes, in a case where the bandwidth between the playback device and the remote decoder would be exceeded, then if there are any B-pictures in the playback segment, the B-pictures can be uniformly eliminated throughout the playback segment. Where B-pictures were present and they have been eliminated, they can be replaced by dummy B-pictures. Again, if there is still insufficient bandwidth available between the playback device and remote decoder, then P-pictures can be eliminated from the playback segment. Importantly, P-pictures can be eliminated from the playback segment and replaced by dummy P-pictures. Preferably, the elimination of P-pictures can start from the end of the segment and proceed towards the beginning of the segment. The replacement of the P-pictures can include uniformly placing the dummy P-pictures through the segment.

Figure 3:
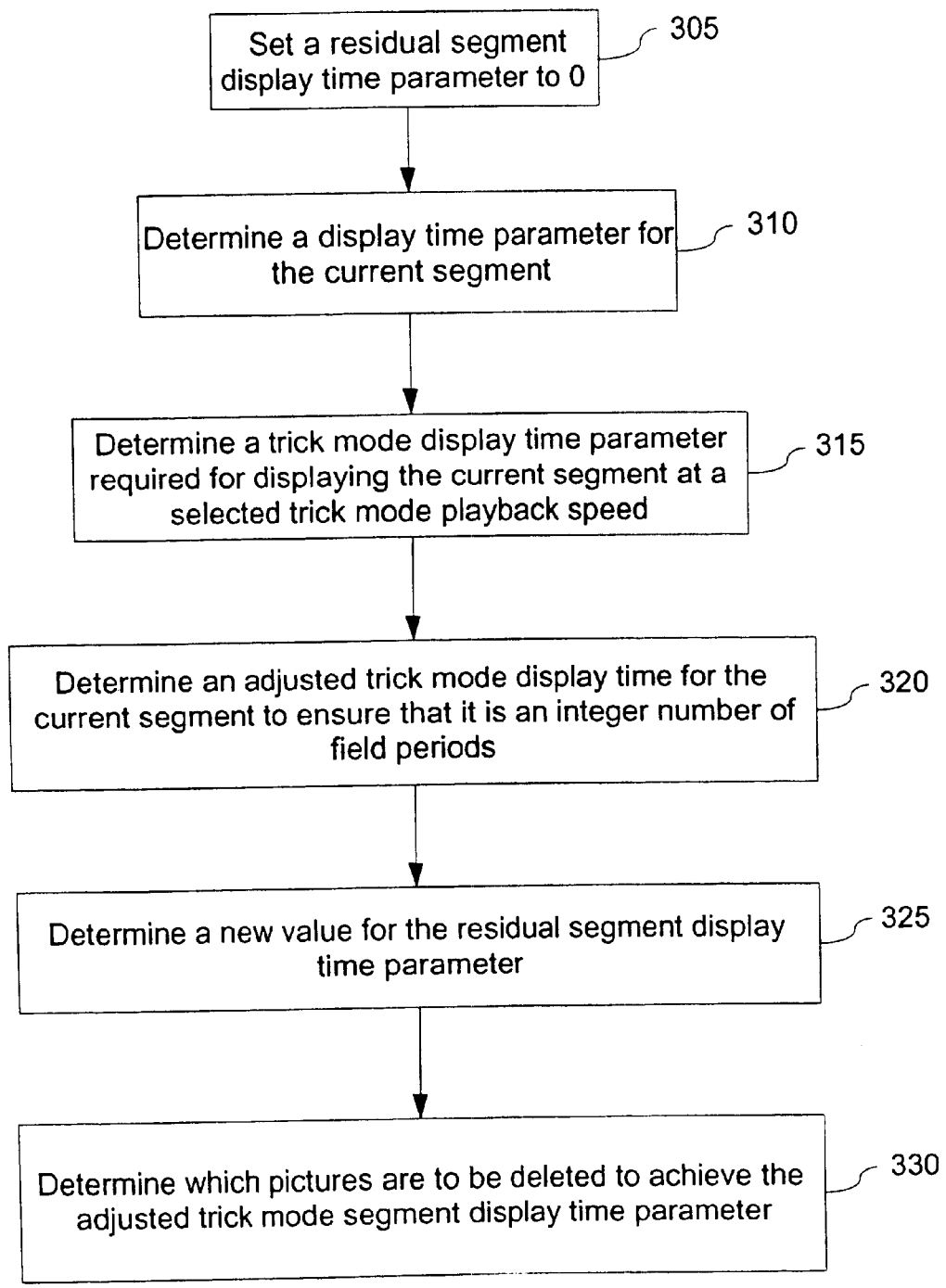
FIG. 3 is a flow chart showing exemplary steps in accordance with the inventive arrangements.

FIG. 3 is a flow chart showing exemplary steps in accordance with the inventive process. Referring to FIG. 3, in step 305, a residual segment display time (res_seg_dsp_time) parameter can be initialized to zero. This step can occur on the first pass through the flow process. The implications of initially setting the res_seg_dsp_time parameter during this step will soon readily be apparent.

In step 310, a display time parameter for the current segment (seg_dsp_time) can be determined. The seg_dsp_time parameter can represent the total time that would be required for displaying all the pictures in the current segment at a normal playback speed (1×). Notably, the seg_dsp_time parameter can be an indicator of the total field period display time that would be required for displaying all the pictures in the current segment at normal speed. In the case of MPEG, the segment would be a GOP.

In step 315, a trick mode segment display (tm_seg_dsp_time) parameter can be determined. The tm_seg_dsp_time parameter can represent the actual length of time that would be required to display the current segment at a selected trick mode playback speed (TMPS). Importantly, for every segment during normal playback, an equivalent trick mode segment can be generated. Therefore, tm_seg_dsp_time determines the length of time that a trick mode segment will occupy. The trick mode segment display time for the current segment can be determined by:

$$tm\_seg\_dsp\_time = seg\_dsp\_time / TMPS.$$

In step 320, an adjusted trick mode segment display time (adj_tm_time) parameter can be determined. The adj_tm_time parameter can represent an adjustment to the trick mode display time (tm_seg_dsp_time), in order to ensure that the display time for the current segment is an integer number of display field period. For example, in the United States, the display field period is quantized to one-sixtieth (1/60) of one second. Similarly, in the Europe, the display field period is quantized to one-fiftieth (1/50). The adj_tm_time can include the total display time that required for displaying the pictures in the current segment and any pictures remaining from a previous segment that were earmarked to be displayed but were not displayed. Importantly, the adjusted trick mode segment display time parameter can be determined by:

$$adj\_tm\_time = tm\_seg\_dsp\_time + res\_seg\_disp\_time.$$

Preferably, the adjusted field display period parameter is rounded down to the nearest integer value. The portion dropped from the rounding down to the next nearest integer value, is the residual segment display time (res_seg_disp_time) in step 305. The residual segment display time can be used to determine the adjusted trick mode playback segment display time for a subsequent segment.

In step 325, the new value for the residual segment display time (res_seg_dsp_time) parameter can be determined by assigning any non-integer portion of the adjusted trick mode segment display time parameter, adj_tm_time, to the remaining field period parameter, res_seg_dsp_time. Advantageously, by adjusting the trick mode display time between segments, the selected average trick mode speed can be kept constant. This gives much greater control and flexibility over the trick mode playback. Importantly, it should be readily recognized that the residual segment display time can optionally be determined. For example, this value can be set to a value of zero, and never changed. In this case, there is no need to have the residual segment display time (res_seg_dsp_time). Importantly, it should be noted that the adjustment of the segment display time can be dependent on the segment or frame structure utilized. For example, in certain instances, it can be appropriate to round the segment display time to an integer number of frame display periods, while in other instances the segment display time can be rounded to an integer number of field display periods. Notwithstanding, the invention is not limited in this regard.

In step 330, a determination or selection can be made regarding which pictures should be deleted to achieve the previously determined adjusted trick mode segment display time, adj_tm_time, parameter for the selected playback trick mode speed.

There are several factors that can be considered when selecting which pictures should be deleted. Notably, these factors can include, but are not limited to, the coding structure of the original recording format, the selected trick mode playback speed, and the bandwidth or maximum bit rate of the channel between the playback device 100 and the remote decoder. Initially, the bit rate of the channel can be determined, and as pictures chosen for deletion are removed from the presentation data stream, the bit rate can continuously be monitored to ensure that the bandwidth of the channel would not be exceeded. To process a subsequent segment, steps 310 through 330 can be repeated. Notably, step 305 is not repeated since its value is determined in step 325.

Importantly, as lower priority pictures are deleted from the segment, the bit rate for the channel typically increases since the picture rate remains the same. This can occur when the pictures with the fewest bits, namely the B-pictures, are deleted and the remaining pictures will have more bits that the average pictures prior to the deletion. Notably, whenever pictures are deleted, the bandwidth of the channel can be checked in order not to saturate or exceed the maximum bandwidth of the channel.

It should be recognized that some or all of the parameters in steps 305–330 can be stored in an information file. Preferably, the parameters can be stored in memory 130 where they can be retrieved, modified and saved by control CPU 122. Control CPU 122 can be configured to execute all the exemplary steps illustrated in FIG. 3.

In determining which pictures are to be deleted to achieve the adjusted segment display time for the selected trick mode speed, it can be preferable to delete those pictures that have the lowest priority within a segment. The types of pictures can be arranged in a hierarchy, with I-pictures having highest priority, followed by P-pictures, and lastly B-pictures having the lowest priority. Within a segment, anchor pictures or reference pictures can have the highest priority to be displayed and will preferably be deleted only after other types of pictures have been deleted. A reference picture is a picture that can be used to predict other pictures. A reference picture can either be an I-picture or a P-picture.

Importantly, since B-pictures have the lowest display priority, B-pictures will only be considered for display when the number of anchor pictures is not enough and the existing bit rate of the segment has not exceeded the maximum permissible bit rate of the channel. In the case where B-pictures were chosen to be transmitted or displayed and the bit rate of the channel would be exceeded, then dummy B-pictures can be used to replace the B-pictures. Preferably, the replacement of B-pictures by dummy B-pictures can occur in such a manner as to evenly distribute the dummy pictures throughout a segment. Advantageously, evenly distributing dummy pictures throughout the segment produces much smoother transition between pictures, thereby reducing jerkiness.

In a case where the B-pictures have been replaced by dummy pictures and the bit rate still exceeds the maximum bit rate of the channel, then P-pictures can be replaced by dummy P-pictures. The replacement of P-pictures by dummy P-pictures can start from the end of the segment and proceed towards the start of the segment. Advantageously, the placement of dummy P-pictures can be done uniformly throughout the segment to ensure an average trick mode speed, which results in a less jerky video, thereby providing a more pleasant viewing experience.

In accordance with another aspect of the invention, user selectable variable trick mode speed can further include slow trick mode playback in the forward direction. Slow trick mode can include playback at speeds slower than normal playback speed of 1x. An output from a decoder such as an MPEG decoder can preferably be connected to an input of a viewer or display device. During slow trick modes, the MPEG GOP or bitstream can be formatted so that some or all of the pictures that are decoded and displayed, are repeated. These pictures can be. repeated one or more times depending on factors such as the slow trick mode playback speed. Repeating the pictures can result in a much longer display time, thereby ensuring that a selected slow trick mode playback speed can be maintained.

Importantly, the pictures can be repeated based on the type of pictures that are present in the segment selected for playback. In the case of MPEG formatted information, a GOP can include I-pictures, B-pictures and P-pictures. In the case of a B-picture, the data representative of the B-picture can be copied and resent for display on the display device. Furthermore, it can also be necessary to alter the temporal reference that indicates the intended display order of the pictures in a GOP.

In the case of I-pictures and P-pictures it can be preferable repeat I-pictures and P-pictures by sending dummy pictures. However, in the case of B-pictures, the data representative of the B-pictures can be repeated by copying and resending the data. Notwithstanding, the invention is not limited in this regard. Subjectively, a dummy picture is an accurate repetition of the picture from which it is predicted. Moreover, a dummy picture is equivalent to and can repeat the picture from which it is predicted. In this regard, decoded dummy pictures can be indistinguishable from the picture from which the dummy picture is predicted from. Advantageously, since I-pictures and P-pictures typically contain more bits than B-pictures, it is preferable to repeat I-pictures and P-pictures with dummy pictures which contain significantly less bits that other pictures. Notably, this can result in the elimination of any problems associated with exceeding a bit rate of the channel between the decoder and the playback device.

Figure 4:
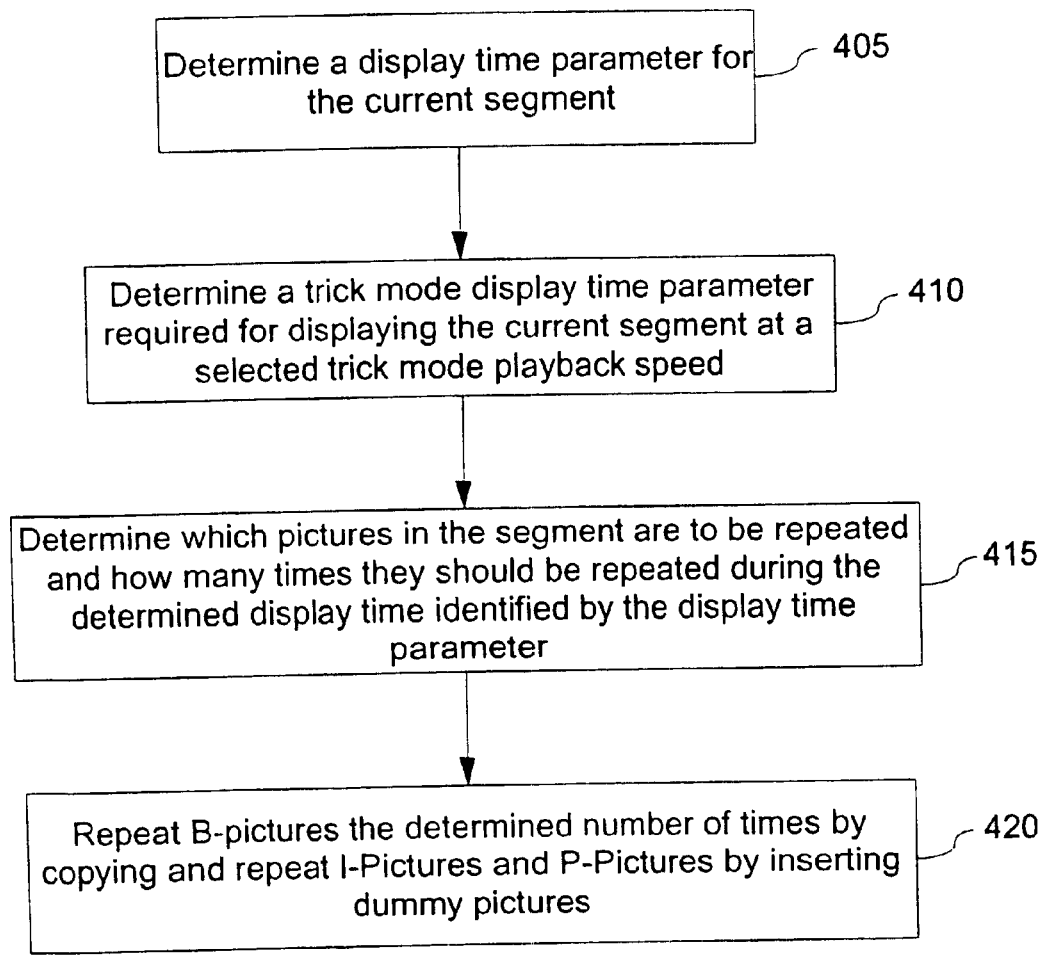
FIG. 4 is a flow chart illustrating exemplary steps for forward slow trick mode during variable trick mode playback in accordance with the inventive arrangements.

FIG. 4 is a flow chart illustrating exemplary steps for forward slow trick mode during variable trick mode playback in accordance with the inventive arrangements. Referring to FIG. 4, in step 405, a display time parameter can be determined for the current segment. In step 410, a trick mode display time parameter required for displaying the current segment at a selected slow trick mode playback speed can be determined. The trick mode display time parameter can be determined by dividing the trick mode display time from step 405 by the selected slow trick playback speed. In step 415, a determination can be made regarding which pictures in the segment are to be repeated and how many times they should be repeated during the determined display time identified by the display time parameter. In step 420, the B-pictures can be repeated by copying and the I-pictures and P-pictures can be repeated by inserting dummy pictures.

In accordance with the inventive arrangements, the pictures in a segment that will be repeatedly displayed to achieve a selected trick mode playback speed can depend on the structure of the segment. For example, in a case where there are no B-pictures present in a GOP, then it can be preferable to add dummy pictures for playback during slow trick mode playback. In a very slow trick mode where I-pictures and P-pictures comprise approximately one-third of the pictures in a GOP, playback might not be visually pleasing if the B-pictures are not repeated. In this case, it can be preferable to copy the B-pictures and repeat the I-pictures and P-pictures using dummy pictures in order to ensure a visually pleasing experience.

In light of the foregoing description of the invention, it should be recognized that the present invention can be realized in hardware, software, or a combination of hardware and software. User selectable variable trick mode according to the present invention can be realized in a centralized fashion, or in a distributed fashion where different video processing elements are spread across several interconnected systems. Advantageously, in such an entertainment system, the information file can be used to communicate information between independently and remotely located MPEG decoders. Any kind of computerized or digital MPEG processing system, or other apparatus adapted for carrying out the methods described herein, is suited.

Although the present invention as described herein contemplates the control CPU 122 of FIG. 1, a typical combination of hardware and software can further include a general purpose computer system with a computer program that, when being loaded and executed, controls the computer system and a digital video recording system similar to the control section 120 of FIG. 1, such that it carries out the methods described herein. The present invention can also be embedded in a computer program product which comprises all the features enabling the implementation of the methods described herein, and which when loaded in a computer system is able to carry our these methods.

A computer program in the present context means any expression, in any language, code or notation, of a set of instructions intended to cause a system having an information processing capability to perform a particular function either directly or after either or both of the following a) conversion to another language, code or notation; b) reproduction in a different material form. The description above is intended by way of example only and is not intended to limit the present invention in any way, except as set forth in the following claims.

What is claimed is:

1. A method for implementing a selectable variable trick mode playback speed for playback of a compressed video presentation stored on a storage medium, comprising:

responsive to a command for trick mode playback of a portion of the video presentation, determining a display time for displaying a segment of said portion of the video presentation at the selected variable trick mode speed;

selecting pictures to be deleted from said segment to achieve said determined display time during the playback of said portion of the video presentation at the selected variable trick mode speed; and deleting said selected pictures.

2. The method according to claim 1, wherein said step of determining said display time for said segment at the selected variable trick mode speed further comprises determining a display time required for displaying said segment at a normal playback speed.

3. The method according to claim 1, wherein said step of determining said display time for said segment at the selected variable trick mode speed further comprises adjusting said display time for said segment to an integer number of field display periods.

4. The method according to claim 3, further comprising the step of adding a residual portion remaining from said adjusted display time for said segment to a trick mode display time for a subsequently displayed segment of said portion of said video presentation played back at the selected variable trick mode speed.

5. The method according to claim 1, wherein said command for trick mode playback of said portion of the video presentation is a forward trick mode command.

6. The method according to claim 1, further comprising the step of displaying a remaining portion of said pictures resulting from said deletion of said determined pictures from said segment, said remaining pictures displayed at the selected variable trick mode speed.

7. The method according to claim 1, wherein said segment of the video presentation is a group of pictures.

8. The method according to claim 1, wherein said selecting step further comprises the step of determining which pictures are to be deleted based on a priority of said pictures.

9. The method according to claim 8, wherein said step of selecting which pictures are to be deleted from said segment further comprises the step of selecting pictures having lowest priority within said segment.

10. The method according to claim 9, further comprising the step of replacing additional lowest priority pictures with dummy pictures if said available bandwidth of said channel would be exceeded when said lowest priority pictures are deleted from said segment.

11. The method according to claim 10, further comprising the step of distributing said dummy pictures evenly throughout said segment.

12. The method of claim 1, further comprising the step of decoding at least a portion of said segment of said portion of the video presentation with a remote decoder.

13. The method of claim 1, wherein said command for trick mode playback is a fast trick mode playback command.

14. A method for implementing a selectable variable trick mode playback speed for playback of a compressed video presentation stored on a storage medium, comprising:

responsive to a command for trick mode playback of a portion of the video presentation, determining a display time for displaying a segment of said portion of the video presentation at the selected variable trick mode speed;

selecting pictures to be repeated from said segment to achieve said determined display time during the playback of said portion of the video presentation at the selected variable trick mode speed; and repeating said selected pictures.

15. The method according to claim 14 wherein said step of determining said display time for said segment at the selected variable trick mode speed further comprises determining a display time required for displaying said segment at a normal playback speed.

16. The method according to claim 14, wherein said step of determining said display time for said segment at the selected variable trick mode speed further comprises adjusting said display time for said segment to an integer number of field display periods.

17. The method according to claim 16, further comprising the step of adding a residual portion remaining from said adjusted display time for said segment to a trick mode display time for a subsequently displayed segment of said portion of said video presentation played back at the selected variable trick mode speed.

18. The method according to claim 14, wherein said command for trick mode playback of said portion of the video presentation is a forward trick mode command.

19. The method according to claim 14, further comprising the step of displaying a remaining portion of said pictures resulting from said repetition of said determined pictures from said segment, said remaining pictures displayed at the selected variable trick mode speed.

20. The method according to claim 14, wherein said segment of the video presentation is a group of pictures.

21. The method according to claim 14, wherein said selecting step further comprises the step of determining which pictures are to be repeated based on a priority of said pictures.

22. The method according to claim 21, wherein said step of selecting which pictures are to be repeated from said segment further comprises the step of selecting pictures having highest priority within said segment.

23. The method according to claim 14, further comprising the step of decoding at least a portion of said segment of said portion of the video presentation.

24. The method of claim 14, wherein said command for trick mode playback is a slow trick mode playback command.

25. A system for implementing a selectable variable trick mode playback speed for playback of a compressed video presentation stored on a storage medium, comprising:

means for determining a display time for displaying a segment of a portion of the video presentation at the selected variable trick mode speed, said means responsive to a command for trick mode playback of said portion of the video presentation;

means for selecting which pictures are to be deleted from said segment to achieve said determined trick mode display time during the playback of said portion of the video presentation at the selected variable trick mode speed; and means for deleting said selected pictures.

26. The system according to claim 25, wherein said means for determining said display time for said segment at the selected variable trick mode speed further comprises means for determining a display time required for displaying said segment at a normal playback speed.

27. The system according to claim 25, wherein said means of determining said display time for said segment at the selected variable trick mode speed further comprises means for adjusting said display time for said segment to an integer number of field display periods.

28. The system according to claim 27, further comprising means for adding a residual portion remaining from said adjusted display time for said segment to a trick mode display time for a subsequently displayed segment of said portion of said video presentation played back at the selected variable trick mode speed.

29. The system according to claim 25, wherein said command for trick mode playback of said portion of the video presentation is a forward trick mode command.

30. The system according to claim 25, further comprising means for displaying a remaining portion of said pictures resulting from said deletion of said determined pictures from said segment, said display means displaying said remaining pictures at the selected variable trick mode speed.

31. The system according to claim 25, wherein said segment of the video presentation is a group of pictures.

32. The system according to claim 25, wherein said selecting means further comprises means for determining which pictures are to be deleted based on a priority of said pictures.

33. The system according to claim 32, wherein said selecting means further comprises means for selecting pictures having lowest priority within said segment.

34. The system according to claim 33, further comprising means for replacing additional lowest priority pictures with dummy pictures if said available bandwidth of said channel would be exceeded when said lowest priority pictures are deleted from said segment.

35. The system according to claim 34, further comprising means for distributing said dummy pictures evenly throughout said segment.

36. The system according to claim 25, further comprising a remote decoder for decoding at least a portion of said segment of said portion of the video presentation.

37. The system according to claim 25, wherein said command for trick mode playback is a fast trick mode playback command.

38. A system for implementing a selectable variable trick mode playback speed for playback of a compressed video presentation stored on a storage medium, comprising:

means for determining a display time for displaying a segment of a portion of the video presentation at the selected variable trick mode speed, said means responsive to a command for trick mode playback of said portion of the video presentation;

means for selecting which pictures are to be repeated from said segment to achieve said determined trick mode display time during the playback of said portion of the video presentation at the selected variable trick mode speed; and means for repeating said selected pictures.

39. The system according to claim 38, wherein said means for determining said display time for said segment at the selected variable trick mode speed further comprises means for determining a display time required for displaying said segment at a normal playback speed.

40. The system according to claim 38, wherein said means of determining said display time for said segment at the selected variable trick mode speed further comprises means for adjusting said display time for said segment to an integer number of field display periods.

41. The system according to claim 40, further comprising means for adding a residual portion remaining from said adjusted display time for said segment to a trick mode display time for a subsequently displayed segment of said portion of said video presentation played back at the selected variable trick mode speed.

42. The system according to claim 38, wherein said command for trick mode playback of said portion of the video presentation is a forward trick mode command.

43. The system according to claim 38, further comprising means for displaying a remaining portion of said pictures resulting from said repetition of said determined pictures from said segment, said display means displaying said remaining pictures at the selected variable trick mode speed.

44. The system according to claim 38, wherein said segment of the video presentation is a group of pictures.

45. The system according to claim 38, wherein said selecting means further comprises means for determining which pictures are to be repeated based on a priority of said pictures.

46. The system according to claim 45, wherein said selecting means further comprises means for selecting pictures having highest priority within said segment.

47. The system according to claim 38, further comprising a remote decoder for decoding at least a portion of said segment of said portion of the video presentation.

48. The system according to claim 38, wherein said command for trick mode playback is a slow trick mode playback command.

* * * * *